United States Patent [19]
Wohlrab et al.

[11] Patent Number: 5,703,920
[45] Date of Patent: Dec. 30, 1997

[54] COMPUTED TOMOGRAPHY APPARATUS WITH IMAGE PRODUCTION USING FOURIER RECONSTRUCTION

[75] Inventors: Juergen Wohlrab, Forchheim; Manfred Herbert, Erlangen-Buechenbach, both of Germany

[73] Assignee: Siemens Akiengesellschaft, Munich, Germany

[21] Appl. No.: 717,604

[22] Filed: Sep. 23, 1996

[30] Foreign Application Priority Data

Oct. 12, 1995 [DE] Germany ......................... 195 38 053.3

[51] Int. Cl.⁶ ............................................................ A61B 6/03
[52] U.S. Cl. ............................................. 378/4; 378/901
[58] Field of Search .......................................... 378/4, 901

[56] References Cited

U.S. PATENT DOCUMENTS 5,224,037  6/1993  Jones et al. ........................... 382/131
5,485,528  1/1996  Horn et al. ............................ 382/131

FOREIGN PATENT DOCUMENTS 43 15 279  10/1994  Germany.

*Primary Examiner*—David P. Porta
*Assistant Examiner*—David Vernon Bruce
*Attorney, Agent, or Firm*—Hill, Steadman & Simpson

[57] ABSTRACT

A computed tomography apparatus which generates an image of an examined subject using Fourier reconstruction with a gridding algorithm operates so that this algorithm is efficiently implemented by employing a hardware unit in the form of an ASIC, which produces the additional formation of contributions in the Cartesian frequency matrix, derived from the polar support points.

4 Claims, 6 Drawing Sheets

Interpolation Window
via a Polar Support
Point SP

COMPUTED TOMOGRAPHY APPARATUS WITH IMAGE PRODUCTION USING FOURIER RECONSTRUCTION

BACKGROUND OF THE INVENTION

1. Field of the Invention

The present invention is directed to a computed tomography apparatus of the type which produces an image of an examination subject by means of Fourier reconstruction.

2. Description of the Prior Art

In computed tomography, fan projections are measured and the fan projections can be converted into parallel projections by means of a suitable interpolation.

For the reconstruction of a sectional image from parallel projections, there are two reconstruction algorithms: convolution back-projection and Fourier reconstruction.

In reconstruction using convolution back-projection, the digitally very costly back-projection can be carried out using an RP-ASIC (German acronym for Back-Projection with Application-Specific Integrated Circuits). The RP-ASIC has clear advantages in speed and costs in relation to an implementation of the back-projection in freely programmable processors, due to its architecture, which is specifically adapted to the back-projection algorithm. A gridding algorithm is known (German OS 43 15 279) for Fourier reconstruction that specifies the transition from the polar grid to the Cartesian grid in the frequency space, but is numerically very costly.

SUMMARY OF THE INVENTION

An object of the present invention is the efficient generation of a computed tomography image with Fourier reconstruction, using a gridding algorithm.

The above object is achieved in accordance with the principles of the present invention in a computed tomography apparatus which generates an image of an examined subject using Fourier reconstruction with a gridding algorithm, which operates so that this gridding algorithm is efficiently implemented, by employing a hardware unit in the form of an ASIC (Application-Specific Integrated Circuit) which produces additional formation of contributions in the Cartesian frequency matrix, derived from the polar support points.

In the inventive computed tomography apparatus, for the efficient implementation of the gridding algorithm a special hardware unit in the form of a GR-ASIC (Gridding with Application-Specific Integrated Circuits)is used.

The address bus, associated with the input data bus, can be omitted, if the addresses belonging to the data are transmitted via the data bus.

DESCRIPTION OF THE PREFERRED EMBODIMENTS

Figure 1:
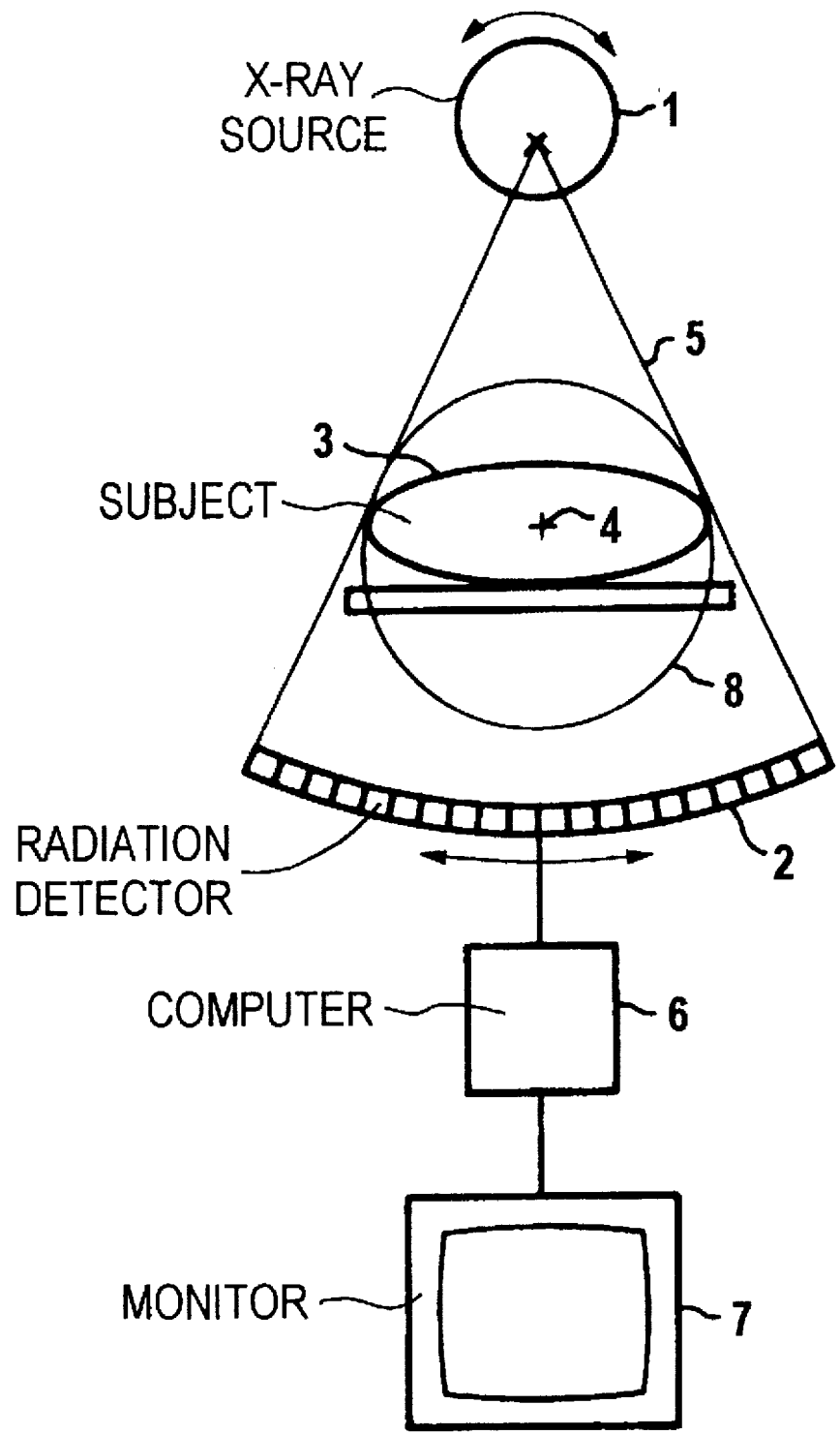
FIG. 1 shows the basic components of a computed tomography apparatus with a fan-shaped beam, for describing the basic idea of the invention.

FIG. 1 shows an X-ray source 1 and a detector 2 composed of a series of detector elements. The X-ray source 1 and the detector 2 rotate around a system axis 4 in order to scan a subject 3, so that the subject 3 is transilluminated from different directions by the fan-shaped X-ray beam 5 emanating from the X-ray source 1. The data supplied by the detector elements of the detector 2 are supplied to a computer 6, which reconstructs sectional images of the subject 3, which are reproduced on a monitor 7. The subject 3 lies in a measurement field 8, acquired by the X-ray beam 5.

Figure 2:
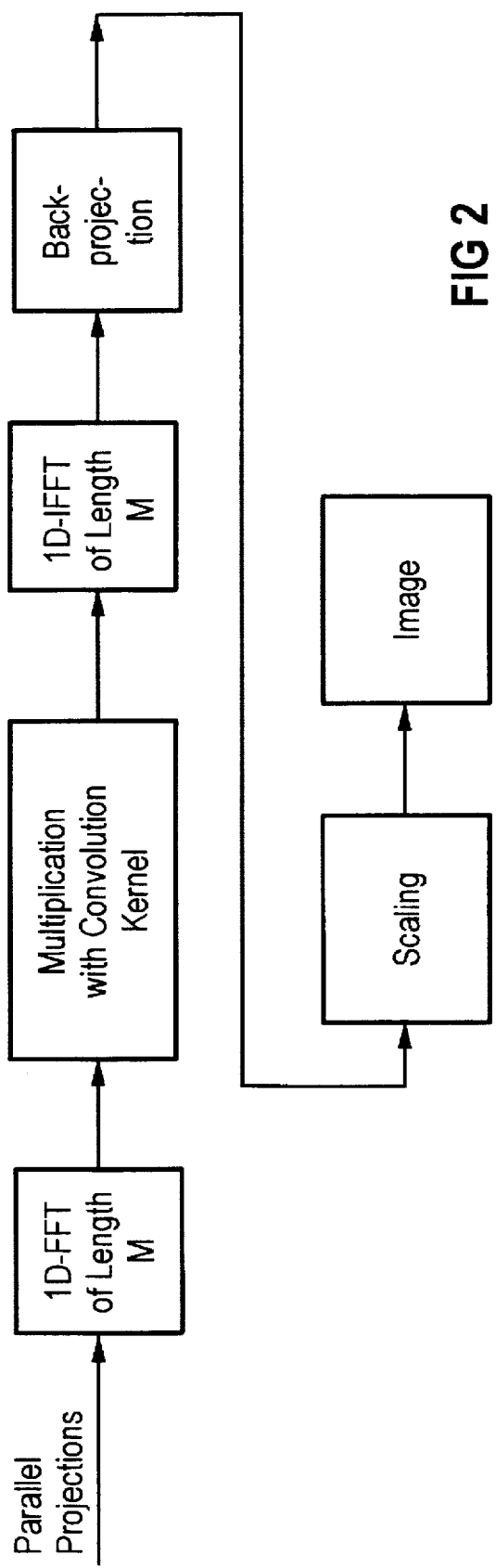
FIG. 2 illustrates the basic steps in a known convolution back-projection technique for generating a computed tomography image.

FIG. 2 shows the program steps in the known convolution back-projection (which is not the subject matter of the invention). The scaling can be started after all parallel projections have run through the preceding program steps. The term parallel projections means data generated by converting data obtained from the fan-shaped beam projections corresponding to parallel radiation.

Figure 3:
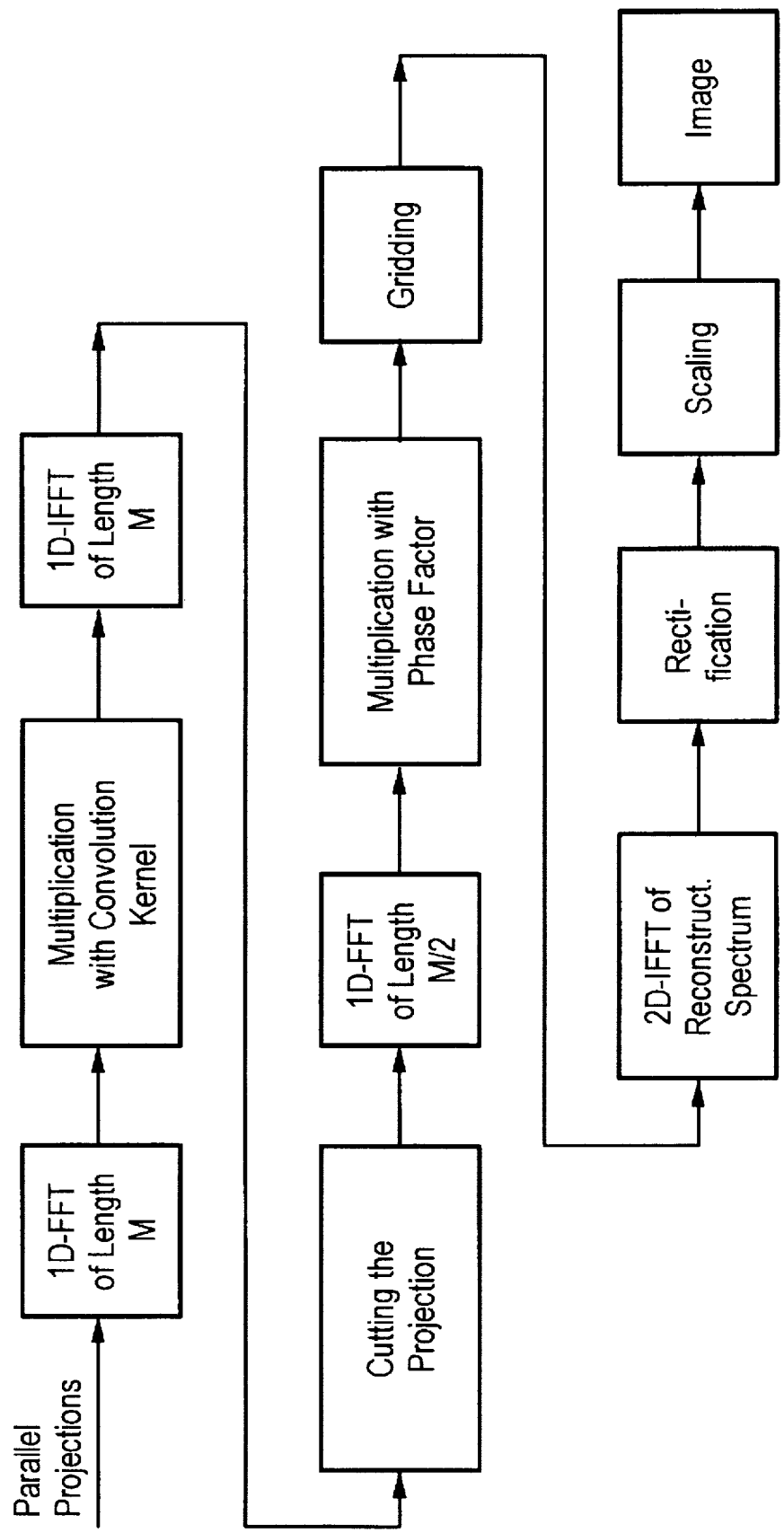
FIG. 3 shows the basic steps for Fourier reconstruction of an image in computed tomography.

FIG. 3 shows the program steps in Fourier reconstruction. The 2D IFFT can be started after all parallel projections have run through the previous program steps.

Representation of use:

The FFTs and multiplications with the convolution Kernel or the phase factor can be adapted to the computing power of the RP-ASIC or GR-ASIC through the use of a corresponding number of freely programmable processors. In order to compare the implementations of the two reconstruction methods with respect to computing speed, it is thus sufficient to compare the processing power of the RP-ASIC and the GR-ASIC.

This is accomplished using the following exemplary values for NKan, M and NPix. A parallel data set with NKan=1500 channels per projection should be present. A length of M=4096 results therefrom for the one-dimensional FFTs. The image to be reconstructed should have NPix*NPix=512*512 pixels.

The comparison between the RP-ASIC and the GR-ASIC should be carried out on the basis of clock steps. For the RP-ASIC, a processing power of 1 pixel per clock step should be assumed. For the GR-ASIC, a processing power of 32 clock steps (for N=4) per support value in the polar grid is assumed.

The number of clock steps for the processing of a projection by the RP-ASIC is NPix*NPix=512*512=262144 clock steps, whereas for the GR-ASIC it is only (M/4+1) *32=1025*32=32800 clock steps.

For the case assumed, the GR-ASIC has eight times the processing power of the RP-ASIC. Due to the ability to cascade the RP-ASIC, this can also be expressed differently: for the assumed case, the GR-ASIC has the same processing power as a cascade of eight RP-ASICs.

In place of the solution with the GR-ASIC, one could also image the gridding algorithm onto freely programmable processors, however, many signal processors would be necessary for this in order to achieve the processing power of the GR-ASIC, which would have higher costs as a consequence. Given the use of a multiprocessor solution, access problems to the memory having the Cartesian frequency matrix would result, which problems are avoided through the use of a GR-ASIC.

Representation of the program steps of the gridding algorithm implemented in the GR-ASIC:

Below, the program steps of the gridding algorithm are specified that are to be implemented in the GR-ASIC.

Figure 4:
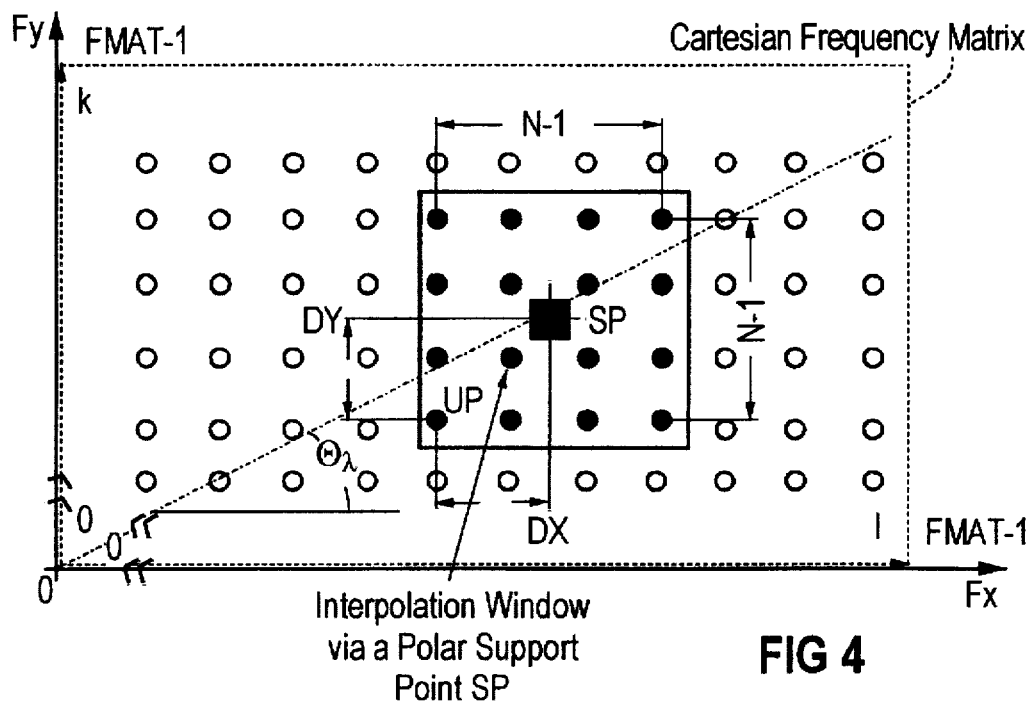
FIG. 4 illustrates a Cartesian frequency matrix of the type used in the computed tomography apparatus of the invention.

In the gridding algorithm, each point of the polar grid contributes to N*N points of the rectangular grid of the Cartesian frequency matrix (FIG. 4). FIG. 4 shows the contribution of a polar support value in the Cartesian frequency matrix, based on N=4.

The Cartesian frequency matrix has the dimension FMAT*FMAT (see FIG. 4). A complex matrix element is referred to below as FM[k][l].

For each polar support value SP, all the following program steps must be executed.

Determination of the coordinates of UP(FXUP,FYUP) from the coordinates of the polar support points SP(FXSP, FYSP):

<1.> FXUP is the x coordinate of the lower left Cartesian grid point UP in the interpolation window (1 subtraction with rounding)

<2.> FYUP is the y coordinate of the lower left Cartesian grid point UP in the interpolation window (1 subtraction with rounding) Determination of the auxiliary quantities DX and DY:

<3.> DX=FXSP−FXUP (1 subtraction)

<4.> DY=FYSP−FYUP (1 subtraction)

The whole-number control variable l, used subsequently in steps <5.> to <22.>, goes from l=0 to l=N−1.

The whole-number control variable j, used subsequently in steps <5.> to <22.>, goes from j=0 to j=N−1.

The index region of the interpolation table goes from p=0 to p=LINTP−1.

Determination of the access indices px[i] and py[j] to the interpolation table of length LINTP:

<5.> px[i] is the value, rounded to the next whole number, of the absolute magnitude of (DX+l)*LINTP*2/N (1 rounding, 1 multiplication and N−1 additions; the value LINTP*2/N represents a constant and needs to be calculated only once)

<6.> py[j] is the value, rounded to the next whole number, of the absolute magnitude of (DY+j)*LINTP*2/N (1 rounding, 1 multiplication and N−1 additions)

Addressing of the values lx[i] and ly[j] of the interpolation table to the calculated access indices px[i] and py[j]:

<7.> lx[i] is the value of the interpolation table at the access index px[i] (N accesses to the interpolation table)

<8.> ly[j] is the value of the interpolation table at the access index py[j] (N accesses to the interpolation table) SP_RE is the real part of the functional value of the polar support point SP. SP_IM is the imaginary part of the functional value of the polar support point SP. Calculation of the additions ZU_RE[j][l] and ZU_IM[j][l] to the elements of the Cartesian frequency matrix that lie in the interpolation window of the polar support points:

<9.> ZUX_RE[i]=SP_RE*lx[i] (N multiplications)

<10.> ZUX_IM[i]=SP_IM*lx[i] (N multiplications)

<11.> ZU_RE[j][l]=ZUX_RE[i]*ly[j] (N*N multiplications)

<12.> ZU_IM[j][l]=ZUX_IM[i]*ly[j] (N*N multiplications)

Calculation of the access indices zl[i] and zk[j] of the elements of the Cartesian frequency matrix that lie in the interpolation window of the polar support points:

<13.> pl[i]=FXUP+l (N additions)

<14.> pk[j]=FYUP+j (N additions)

<15.> zl[i]=pl[i] is imaged modulo onto the region [0,FMAT−1]

<16.> zk[j]=pk[j] is imaged modulo onto the region [0,FMAT−1]

Addressing of the values FMZ[zk[j]][zl[i]] of the elements of the Cartesian frequency matrix that lie in the interpolation window of the polar support points:

<17.> FMZ_RE[zk[j]][zl[i]] is the real part value of the memory of the Cartesian frequency matrix FM[zk[j]][zl[i]] (N*N accesses to the Cartesian frequency matrix)

<18.> FMZ_IM[zk[j]][zl[i]] is the imaginary part value of the memory of the Cartesian frequency matrix FM[zk[j]][zl[i]] (N*N accesses to the Cartesian frequency matrix)

Formation of the additions to the elements of the Cartesian frequency matrix that lie in the interpolation window of the polar support points:

<19.> FMZE_RE[zk[j]][zl[i]]=FUZ_RE[zk[j]][zl[i]]+ZU_RE[j][l] (N*N additions)

<20.> FMZE_IM[zk[j]][zl[i]]=FMZ_IM[zk[j]][zl[i]]+ZU_IM[j][l] (N*N additions)

Delivery of the calculated values into the memory of the Cartesian frequency matrix:

<21.> The real part of the memory cell FM[zk[j]][zl[i]] in the Cartesian frequency matrix is overwritten with the newly calculated value FMZE_RE[zk[j]][zl[i]]. (N*N accesses to the Cartesian frequency matrix)

<22.> The imaginary part of the memory cell FM[zk[j]][zl[i]] in the Cartesian frequency matrix is overwritten with the newly calculated value FUZE_IU[zk[j]][zl[i]]. (N*N accesses to the Cartesian frequency matrix)

Interfaces of the GR-ASIC:

For the execution of the gridding algorithm, as input data the functional values of the polar support values SP and the Cartesian coordinates (FX,FY) of the polar support values SP in the frequency region are required. The output data of the gridding algorithm comprise the Cartesian frequency matrix. Both the functional values of the polar support values SP and the data of the Cartesian frequency matrix are complex. For the delivery of the Cartesian coordinates of the polar support values SP to the GR-ASIC, two variants can be used:

VK1: coordinate delivery variant 1:

The Cartesian coordinates (FX,FY) of the polar support values SP are respectively written in coordinate input buffers of the ASIC after the delivery of the polar support values SP.

VK2: coordinate transmission variant 2:

All polar support values SP of a projection spectrum are delivered into the GR-ASIC in a block transfer. At the beginning of the block transfer, the subsequently designated setup values are thereby delivered to the GR-ASIC, from which values the GR-ASIC can itself generate the Cartesian coordinates of the polar support values SP delivered in the block transfer:

The Cartesian coordinate increments DFX and DFY between the support values delivered in the block transfer and the number of support values in the block transfer.

Figure 5:
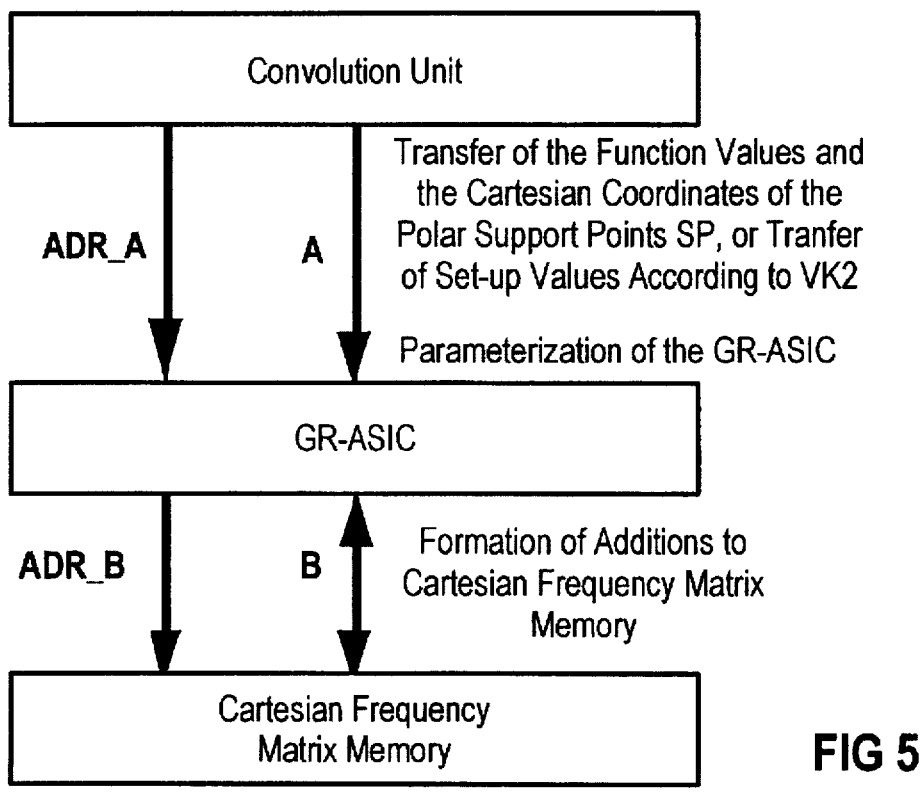
FIG. 5 illustrates interfaces to the GR-ASIC in the computed tomography apparatus of the invention.

The functional values of the polar support values SP and the Cartesian coordinates (FX,FY) of the polar support values SP, or the associated set-up values, are written into different input buffers of the GR-ASIC via a data bus A (see FIG. 5). An FIFO design is recommended for the input buffer.

FIG. 5 shows a representation of the interfaces of the GR-ASIC. The interpolation table and the parameters required for the gridding algorithm are loaded via the data bus A during an initialization phase. The address bus ADR_A serves for the addressing of the different input buffers and of the interpolation table memory. Via the bidirectional data bus B, the GR-ASIC forms additions to random data with the address RAND of the memory of the Cartesian frequency matrix, by means of read-modify-write accesses. The associated address RAND is generated by the GR-ASIC and applied to the address bus ADR_B, via which the memory of the Cartesian frequency matrix is addressed.

Figure 6:
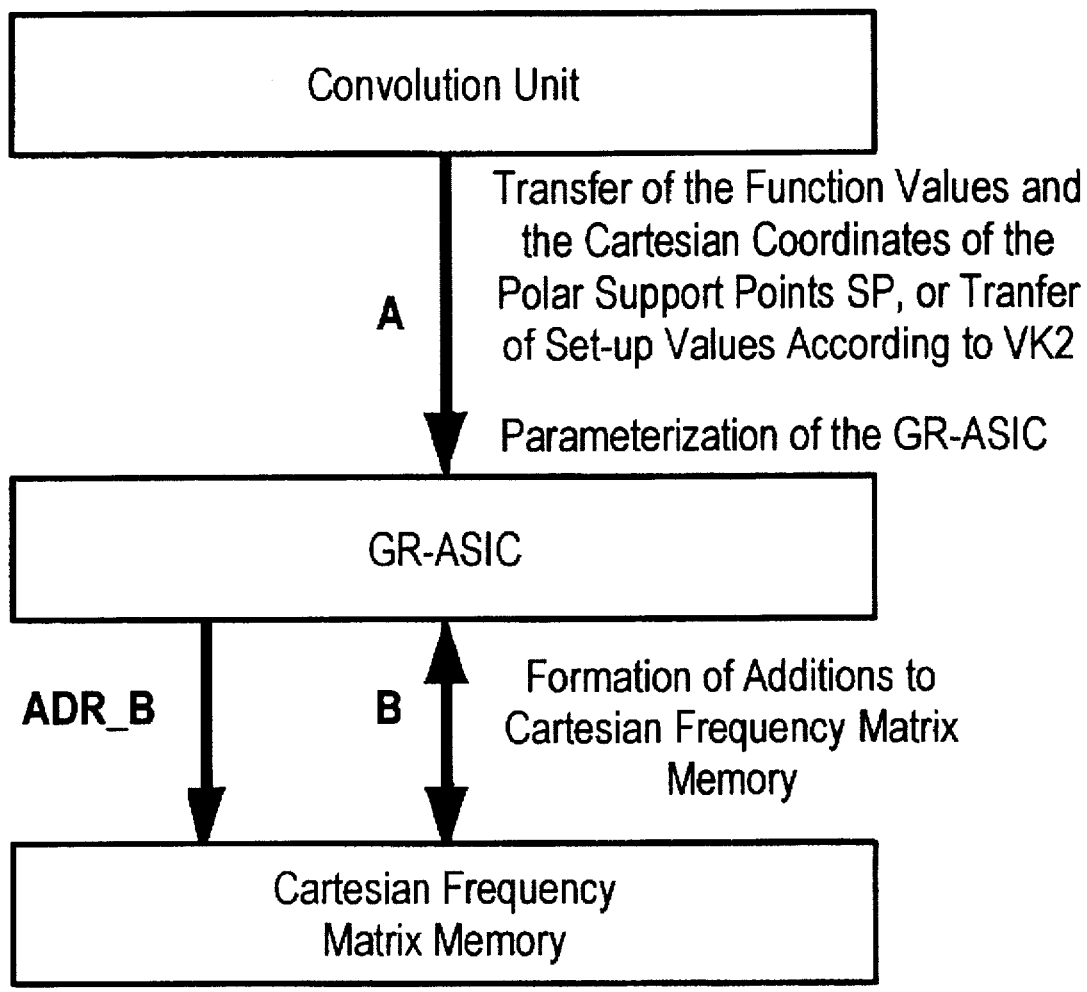
FIG. 6 illustrates a further embodiment of the interfaces for the GR-ASIC in the computed tomography apparatus of the invention.

FIG. 6 shows a representation of the interfaces of a further version of the GR-ASIC that does without the address bus ADR_A. In this case, the addresses belonging to the data must be transmitted via the data bus A.

Imaging of the program steps onto the components of the GR-ASIC:

In the following, the program steps <1.> to <22.> are referred to:

In order to keep the number of accesses to the bus B as low as possible, the real and imaginary parts of the Cartesian frequency matrix are accessed in parallel fashion via the bus B. A total of 2*N*N accesses to the bus B are thus required for the processing of a polar support point SP. These are combined as follows:

Program step <17.> and <18.> parallel: N*N accesses,
program step <21.> and <22.> parallel: N*N accesses.

Figure 7:
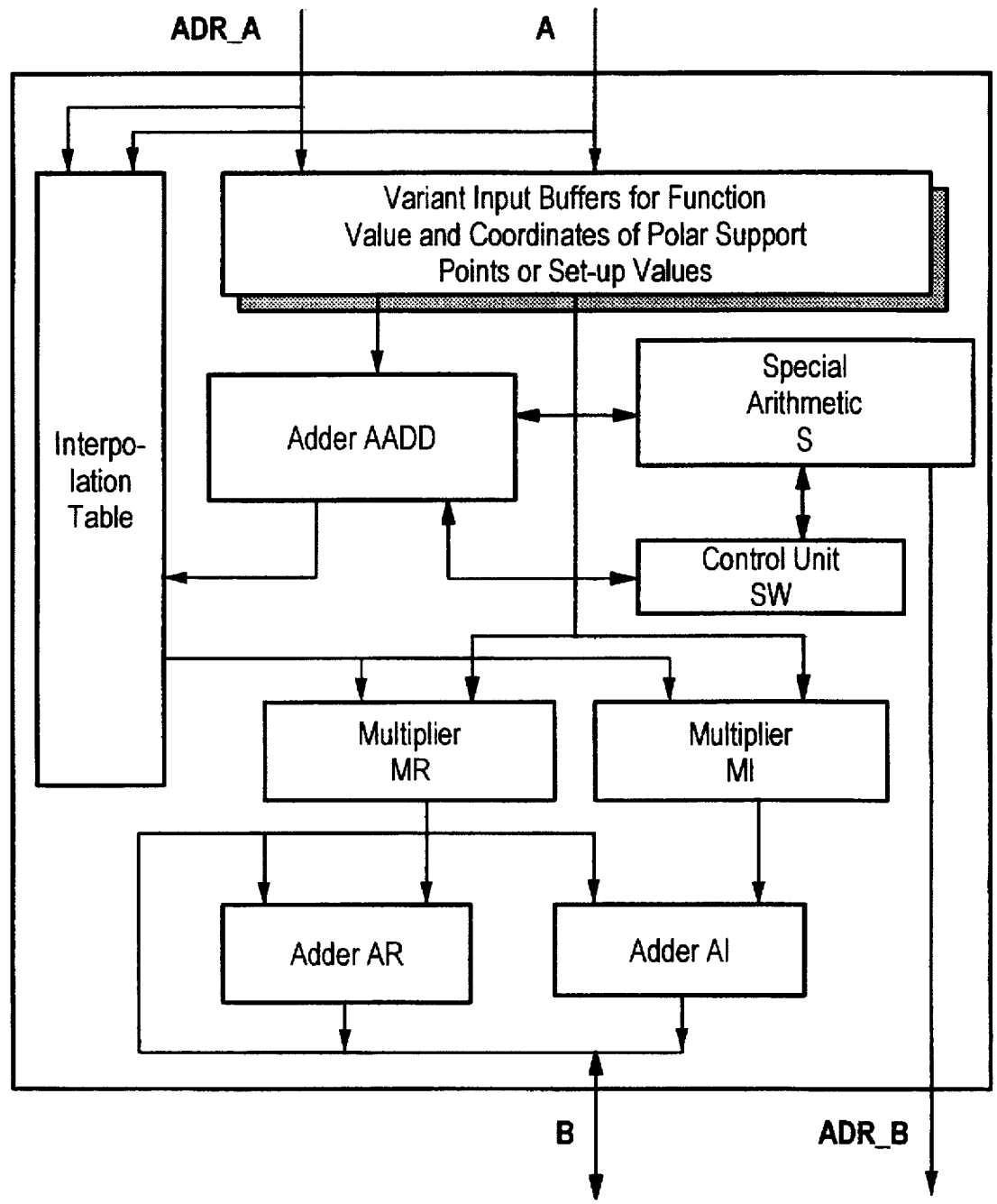
FIG. 7 is a block diagram of GR-ASIC of the computed tomography apparatus of the invention.

FIG. 7 shows a representation of the functional blocks of the GR-ASIC, with selected data paths. The computing elements (see FIG. 7) of the GR-ASIC are designed with respect to processing power so that all the program steps are hidden behind the 2*N*N accesses to the bus B. The number of accesses to the bus B thus determines the processing power of the GR-ASIC. If it is assumed that each access to the bus B has the duration of a clock step, the GR-ASIC has a processing power of 2*N*N clock steps for the processing of a polar support value.

In the following, a possible division of the program steps <1.> to <22.> into the functional blocks shown in FIG. 7 is represented. A utilization of the capacity of the functional block for the processing of a polar support point SP is thereby indicated in the form of clock steps.

Adder AADD
+1 subtraction of program step <1.>: 1 clock step
+1 subtraction of program step <2.>: 1 clock step
+1 subtraction of program step <3.>: 1 clock step
+1 subtraction of program step <4.>: 1 clock step
+N−1 additions of program step <5.>: N−1 clock steps
+N−1 additions of program step <6.>: N−1 clock steps
+N additions of program step <13.>: N clock steps
+N additions of program step <14.>: N clock steps
Total number of clock steps of the adder AADD: 4*N+2

Special arithmetic S:
+1 rounding of program step <1.>: 1 clock step
+1 rounding of program step <2.>: 1 clock step
+1 rounding of program step <5.>: 1 clock step
+1 rounding of program step <6.>: 1 clock step
+1 multiplication of program step <5.>: 1 clock step
+1 multiplication of program step <6.>: 1 clock step
+N modulo computations of program step <15.>: N clock steps
+N modulo computations of program step <16.>: N clock steps
Total number of clock steps of special arithmetic S: 2*N+6

Access to interpolation table INTTAB:
+N accesses from program step <7.>: N clock steps
+N accesses from program step <8.>: N clock steps
Total number of clock steps during access to the interpolation table INTTAB: 2*N Multiplier MR
+N multiplications from program step <9.>: N clock steps
+N*N multiplications from program step <11.>: N*N clock steps
Total number of clock steps from the multiplier MR: N+N*N Multiplier MI
+N multiplications from program step <10.>: N clock steps
+N*N multiplications from program step <12.>: N*N clock steps
Total number of clock steps from the multiplier MI: N+N*N Adder AR
N*N additions from program step <19.>: N*N clock steps Adder AI
N*N additions from program step <20.>: N*N clock steps As the utilization of capacities of the individual functional blocks for the processing of a polar support point SP shows, in the case (important in practice) of N>2, the capacity utilization of all functional blocks is smaller than the value 2*N*N, which results by means of the clock steps during access to the bus B. All program steps can thus be hidden behind the access to the Cartesian frequency matrix by means of suitable nesting.

The duration of 2*N*N clock steps for the processing of a polar support cell results as the processing power of the GR-ASIC.

The control unit SW controls the interfaces of the GR-ASIC, controls the sequence of calculations in the functional blocks, and takes over the generation of addresses.

The architecture of the GR-ASIC shown in FIG. 7 is designed so that all calculations of the GR-ASIC can be hidden behind the accesses to the memory SKART. The access bandwidth of the GR-ASIC to the memory SKART of the Cartesian frequency matrix thus determines the processing power of the GR-ASIC.

The maximum access bandwidth of the GR-ASIC to the Cartesian frequency matrix in the memory SKART is achieved when the GR-ASIC alone has right of access to the memory SKART. In this way, the time-consuming indivisible read-modify-write accesses and the required arbitration during access to the memory START are avoided, which would arise upon access of several subscribers to the memory SKART.

This represents an important advantage of the use of a GR-ASIC according to relation to an implementation of the gridding algorithm with a multiprocessor system, in which several processors would have to share the right of access to the memory having the Cartesian frequency matrix. If several subscribers have access to the memory SKART, the access bandwidth to the memory SKART decreases, due to arbitration expense.

The parallel projections NPROJ_ALL to be processed can be divided into NE units En with n=1 to n=NE by GR-ASICs Gn (claim 1), with associated memory SKART Sn (according to claim 3). The gridding can thus be processed in parallel on the NE units En. As soon as the gridding is concluded on all NE units En, the access by the GR-ASICs Gn to the memory Sn can be removed.

Another addition unit ADD_S, which adds the Cartesian frequency matrices of all NE memories Sn, can then be granted access to the memories Sn. The result of this addition is the Cartesian frequency matrix that arises by taking into account all the parallel projections NPROJ_ALL to be processed.

Although modifications and changes may be suggested by those skilled in the art, it is the intention of the inventors to embody within the patent warranted hereon all changes and modifications as reasonably and properly come within the scope of their contribution to the art.

We claim as our invention:

1. A computed tomography apparatus comprising an X-ray source which emits an X-ray fan beam, a radiation detector on which said fan beam is incident after penetrating a subject and which emits measurement data corresponding to said fan beam attenuated by said subject, means for rotating said X-ray source and said radiation detector around said subject to obtain measurement data from a plurality of different angular projections, computer means for reconstructing an image from the measurement data according to a Fourier reconstruction method, and an ASIC in said computer means having computational means for processing a gridding algorithm for forming additional contributions in a Cartesian frequency matrix derived from polar support points.

2. A computer tomography apparatus according to claim 1, further comprising interfaces to said computational means, said interfaces comprising:

an input data bus and an associated first address bus forming in combination, means for delivering, to the computational means, parameterization values required for executing the gridding algorithm by the computational means, functional values of the polar support values for said polar support points, whose contribution in the Cartesian frequency matrix is to be determined by the gridding algorithm, and Cartesian coordinates of the polar support values or of set-up values for the self-sufficient generation of the Cartesian coordinates of the polar values by the ASIC; and a bidirectional data bus and an associated second address bus comprising in combination, means for forming the additional contributions derived from the polar support points in the Cartesian frequency matrix.

3. A computed tomography apparatus according to claim 2, wherein said computer means includes a memory having memory accesses, in which the Cartesian frequency matrix is stored, connected to the ASIC via the bidirectional data bus and the second address bus, the computational means in the ASIC means for conducting all computations that must be carried out by the ASIC hidden behind the accesses to the memory, and said ASIC comprising an ASIC having computing power permitting a maximum access bandwidth to the memory to be utilized.

4. A computed tomography apparatus comprising an X-ray source which emits an X-ray fan beam, a radiation detector on which said fan beam is incident after penetrating a subject and which emits measurement data corresponding to said fan beam attenuated by said subject, means for rotating said X-ray source and said radiation detector around said subject to obtain measurement data from a plurality of different angular projections, and computer mean for reconstructing an image from the measurement data according to a Fourier reconstruction method, said computer means including computational means having a parallel arrangement of a plurality of ASICs with respectively associated memories, for means of partitioning of polar support points to the ASICs, forming additional contributions in a Cartesian frequency matrix, derived from the polar support points, accelerated by parallel processing.

* * * * *